(12) United States Patent
Zwiers

(10) Patent No.: US 6,629,845 B2
(45) Date of Patent: Oct. 7, 2003

(54) PRODUCTS & METHODS THAT HARNESS THE POWER OF FUN TO MOTIVATE CHILDREN

(76) Inventor: Nancy A. Zwiers, 5717 Madrid La., Long Beach, CA (US) 90814

( * ) Notice: Subject to any disclaimer, the term of this patent is extended or adjusted under 35 U.S.C. 154(b) by 0 days.

(21) Appl. No.: 09/802,147

(22) Filed: Mar. 8, 2001

(65) Prior Publication Data

US 2001/0031449 A1 Oct. 18, 2001

Related U.S. Application Data

(60) Provisional application No. 60/187,964, filed on Mar. 9, 2000.

(51) Int. Cl.[7] ................................................. G09B 1/36
(52) U.S. Cl. ....................................... 434/171; 434/176
(58) Field of Search ................................ 434/167, 170, 434/171, 172, 176, 236, 237, 238; 446/386; 426/104, 112

(56) References Cited

U.S. PATENT DOCUMENTS

| | | | |
|---|---|---|---|
| 279,812 A | | 6/1883 | Richter |
| 335,837 A | * | 2/1886 | Peckham .................... 116/306 |
| 1,595,356 A | | 8/1926 | Moseman |
| 2,282,881 A | | 5/1942 | Ostrow |
| 2,652,702 A | | 9/1953 | Hintze |
| 3,769,720 A | | 11/1973 | Terrones |
| 4,165,890 A | * | 8/1979 | Leff ............................. 283/46 |
| 4,681,000 A | | 7/1987 | Wolters |
| 4,696,473 A | | 9/1987 | Wyzykowski |
| 4,795,033 A | * | 1/1989 | Duffy .......................... 206/457 |
| 4,873,099 A | * | 10/1989 | Ruiz ........................... 426/104 |
| 4,874,083 A | | 10/1989 | Antoni et al. |
| 4,988,110 A | * | 1/1991 | Zuckerman et al. ..... 229/87.01 |
| 5,017,394 A | | 5/1991 | Macpherson et al. |
| 5,447,584 A | * | 9/1995 | Shakespeare et al. ........ 156/256 |
| 5,573,438 A | * | 11/1996 | D'Andrea .................... 434/429 |
| 5,727,946 A | * | 3/1998 | Rosen .......................... 101/327 |
| 5,728,414 A | * | 3/1998 | Terrasi ........................ 426/104 |
| 5,731,020 A | | 3/1998 | Russo |
| 5,804,235 A | * | 9/1998 | Altschul ..................... 426/103 |
| 5,823,329 A | | 10/1998 | Roberts |
| 5,954,561 A | | 9/1999 | Cannone |

* cited by examiner

Primary Examiner—Kien T. Nguyen
(74) Attorney, Agent, or Firm—John J. Connors; Connors & Assoc., Inc.

(57) ABSTRACT

A method is disclosed of motivating a child to want to do what is beneficial, including the steps of (a) providing an item which the child interacts with to establish a play pattern that is fun for the child, (b) packaging the item in a manner that is convenient to use and wherein the packaging assists in establishing the play pattern.

7 Claims, 6 Drawing Sheets

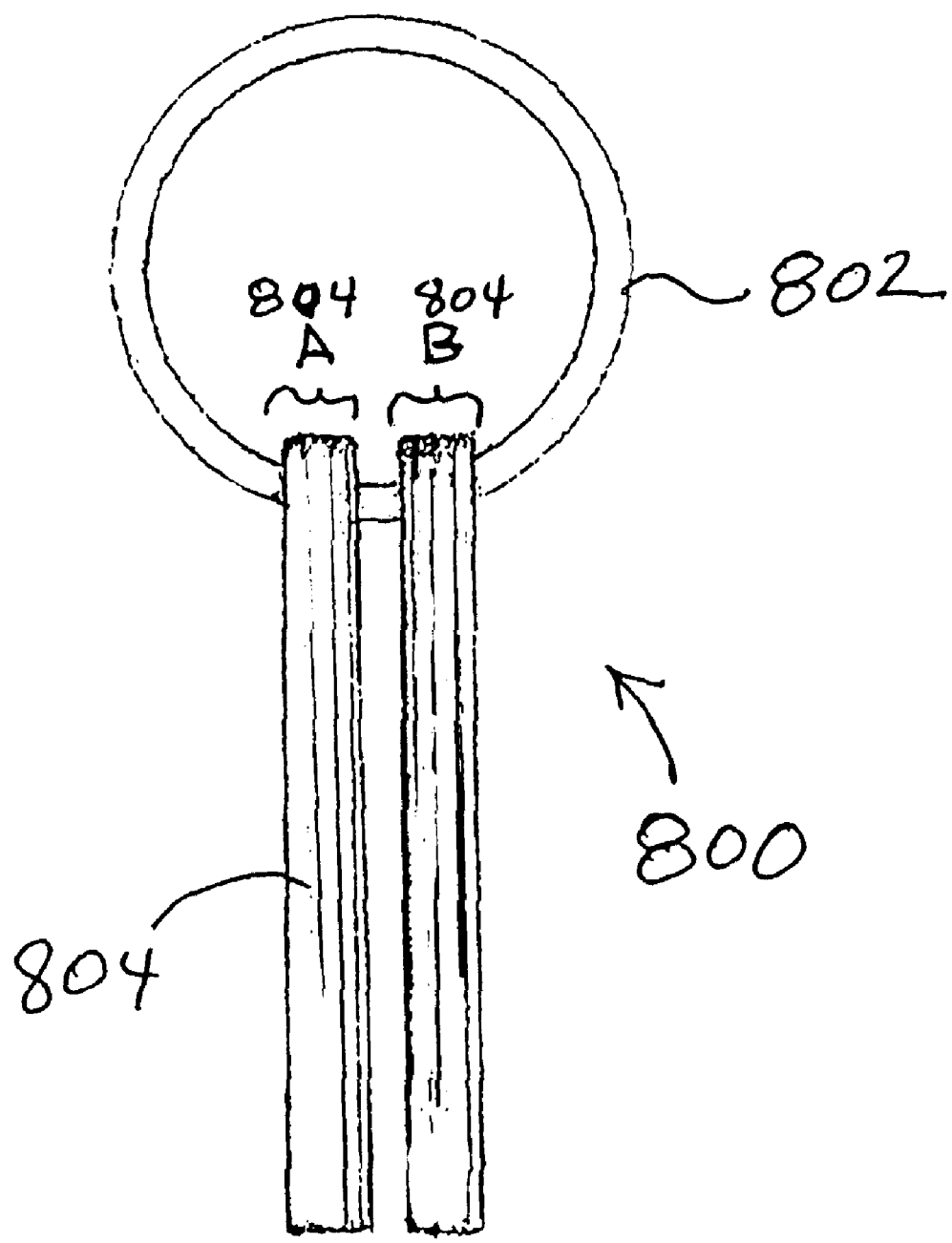

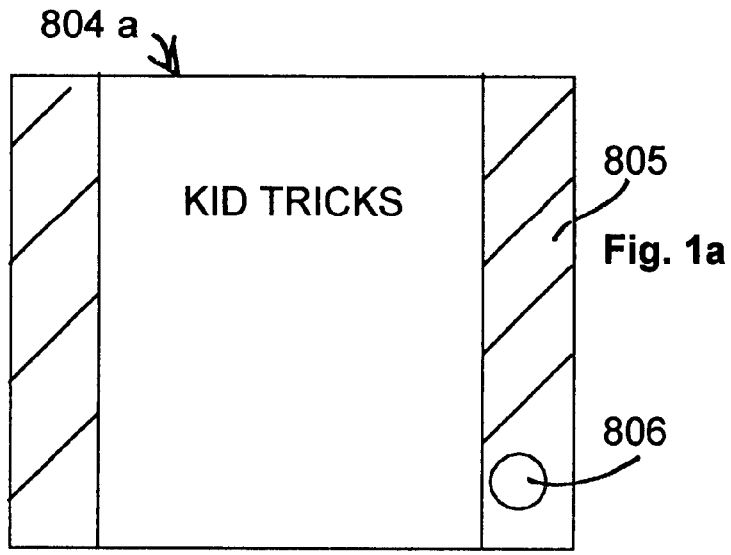
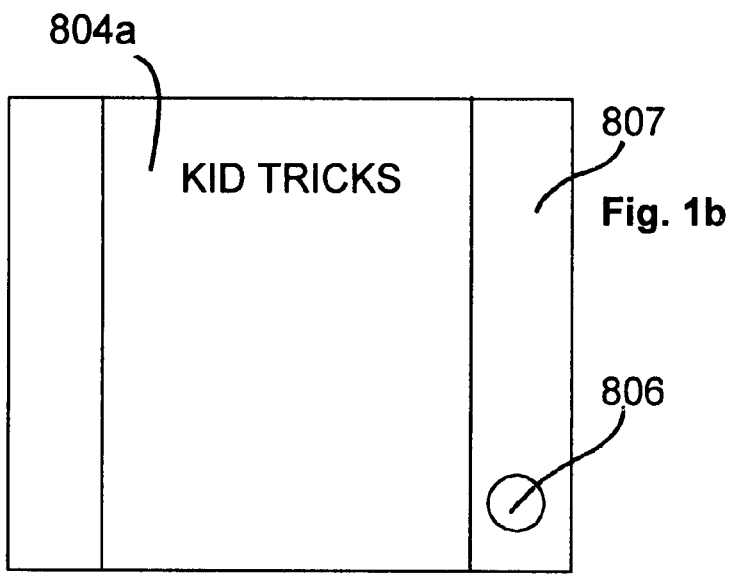
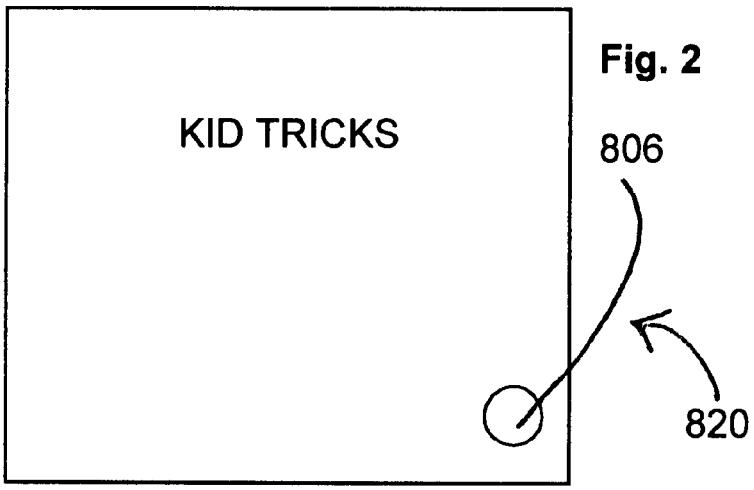

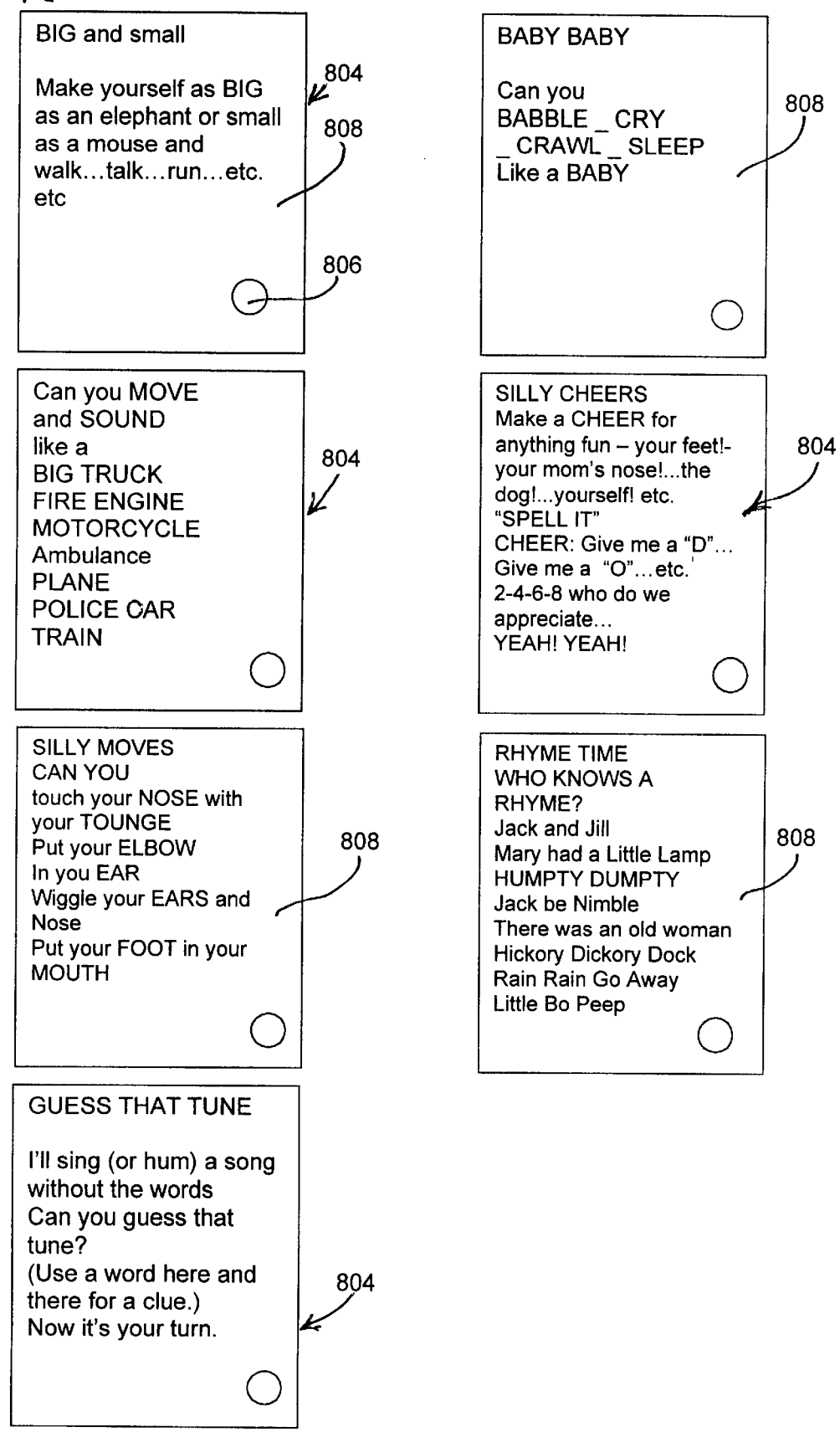

Fig. 1b'

Farm Yard Game

I have a farm and in my farm I want a...

804
810
806

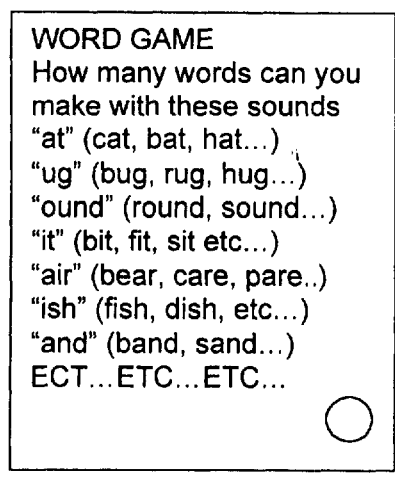

WORD GAME
How many words can you make with these sounds
"at" (cat, bat, hat...)
"ug" (bug, rug, hug...)
"ound" (round, sound...)
"it" (bit, fit, sit etc...)
"air" (bear, care, pare..)
"ish" (fish, dish, etc...)
"and" (band, sand...)
ECT...ETC...ETC...

804

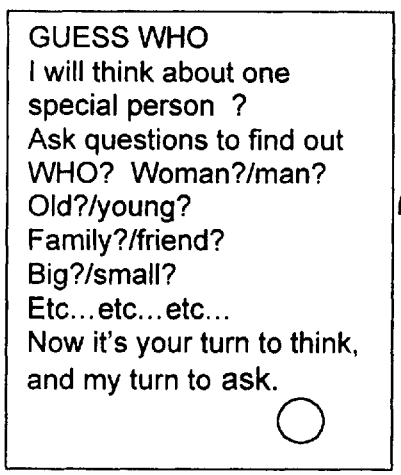

GUESS WHO
I will think about one special person ?
Ask questions to find out WHO? Woman?/man? Old?/young?
Family?/friend?
Big?/small?
Etc...etc...etc...
Now it's your turn to think, and my turn to ask.

804

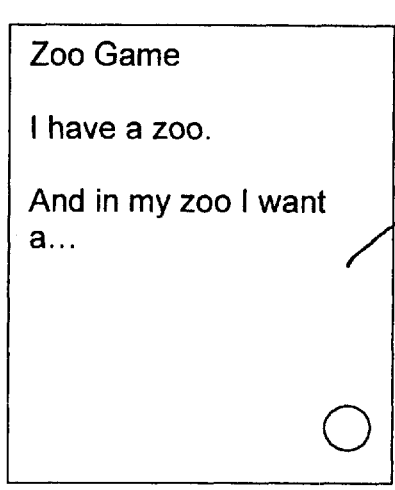

Zoo Game

I have a zoo.

And in my zoo I want a...

810

BIRTHDAY PARTY Time!

When is your birthday?
What would you like at your birthday party?
What Friends?
Foods? Games? Fun?

810

PRODUCTS & METHODS THAT HARNESS THE POWER OF FUN TO MOTIVATE CHILDREN

RELATED APPLICATIONS

This application is a utility patent application based on U.S. provisional patent application Ser. No. 60/187,964, filed Mar. 9, 2000, entitled Food Products And Processes For Motivating Kids, which is incorporated herein by reference and made a part of this application.

BACKGROUND OF THE INVENTION

An industry has been developed around the concept of motivation. Consultants have long been advising people how to motivate themselves and others through books, tapes, lectures, and tools. Some of these consultants have developed companies, such as Stephen Covey of Franklin-Covey Co. and Patricia McDade of Consulting Alliance, that explain to individuals and organizations how to motivate for positive results.

However, each type of person or organization requires different types of motivational tools to achieve desired goals. Businesses and other adult organizations may focus on the goals of the organization and apply motivational techniques and tools to motivate people within the organization to achieve those goals. Adults, in terms of their personal life, may utilize tools to encourage improved financial standing, a more well-rounded lifestyle, better relationships, increased communication skills for example. Some of the tools have common characteristics, such as goal setting, evaluation of motivations to perform actions, reward systems for achievement of goals, and the like.

The motivation of children, or kids, uses many of the common characteristics of motivation of adults. However one must keep in mind that kids do not in general comprehend, and therefore are not motivated by, the same motivational tools as are adults. Kids are more motivated by immediate gratification than mature adults. Kids may not be as motivated by what is for the common good or what is for the long range good.

A successful method of choosing an appropriate motivator, whether it be for kids or adults, is to observe how the person to be motivated approaches life. An adult who approaches life in the context of money and is interested in financial gains is motivated when the motivational tools incorporate monetary goals and rewards. According to Dr. Kim Bergman, "Play is the language of kids," and therefore kids approach life in the context of play. As a result, motivators that incorporate playfulness and fun have an increased chance of success Universally, parents and other caretakers of kids are interested in ensuring kids eat healthy foods. Rare is the child that is motivated alone by a statement such as "eat this—it is good for you." The prior art has examples of motivators that are used to incorporate play into children eating, such as reward systems for kids that eat daily from each of the major food groups.

A product from OSCAR MEYER know as LUNCH-ABLES incorporates playful motivators to the children eating the food components in the product by having the children prepare a snack from the different components. Children perceive their involvement with the snack preparation process as playful, and therefore it motivates them to eat the food components. However, the container that holds the food components is boxy and very stark and, therefore, does not motivate children through the incorporation of playfulness. Yogurt has also been sold in this fashion, with the same problem about the container having a relative low appearance and perception of playfulness.

Therefore, a need exists for even more motivators that incorporate playfulness into having kids eat healthy, nutritious foods.

In addition to motivating children to eat what is good for them, they also need to be encouraged to do certain things that is either good for them as individuals or good for the community. Consequently, in certain situations, for example, they need to get dressed, eat, go to bed, help out, or simply be quit or stop what they are doing and do something else like go to the dentist. In such situations food is not an issue. Another item besides foods may, however, be used to establish a play pattern that will motivate them to engage in the desired activity.

SUMMARY OF THE INVENTION

This invention has several features that are set forth in the CLAIMS. These features provide this invention with its many desirable attributes. After reading the following section entitled "DETAILED DESCRIPTION OF THE PREFERRED EMBODIMENTS," one will understand how the features of this invention provide its benefits, which include, but are not limited to, convenience of use and, most importantly, encouraging children to do what is good for them through the power of fun.

Broadly, this invention is a method of motivating a child to want to do what is beneficial. It includes the steps of (a) providing an item which the child interacts with to establish a play pattern that is fun for the child, and (b) packaging the item in a manner that is convenient to use and wherein the packaging assists in establishing the play pattern.

In some embodiments the item is a plurality of cards. This invention also includes child friendly products including these items.

In the embodiments where the item is a plurality of cards, the cards are assembled into a deck and each card has one face with a common imprint (the backside) and an opposite face imprinted with instructions (front side) for a play activity in which the child will engage. With the cards all having the front side positioned so the child can not see the activity imprinted on the cards, the child selects a card. The instructions typically require the parent or other care taker of the child to interact with the child by also engaging in the activity imprinted on the card selected by the child. There is a different activity imprinted on each card in the deck, and the cards are organized into groups that correspond to activities especially suited to certain situations. Preferably, the different groups of cards are marked with indicia indicating the situation in which a selected card group is to be used. The indicia may be one or more words or a color code. Typical situations include getting dressed, coming and going, mealtime, bedtime, helping out, and bath time. One group of cards may be designed for an active situation and another group of cards is designed for a situation where the child is quit.

DESCRIPTION OF THE DRAWING

The preferred embodiments of this invention, illustrating all its features, will now be discussed in detail. These embodiments depict the novel and non-obvious child friendly products of this invention and methods using these products as shown in the accompanying drawing, which is for illustrative purposes only. This drawing includes the following figures (FIGS.), with like numerals indicating like parts:

FIG. 1 is a front elevational view one embodiment of this invention showing a display of a key ring carrying a deck of two different groups of playing cards, one group of cards (FIG. 1a') designed for an active situation and another group of cards (FIG. 1b') designed for a situation where the child is substantially quit.

FIG. 1a is a plan view of the backside of the group of cards for use when the child is active.

FIG. 1b is the backside of the group of cards for use when the child is substantially quit.

FIG. 2 is the backside of a number of different groups of playing cards shown in FIGS. 3 through 8, with the front sides of these different groups depicted in FIGS. 3 through 8 where the group of cards shown in FIG. 4 are used when the child is getting dressed, the group of cards shown in FIG. 5 are used to encourage the child to help out, the group of cards shown in FIG. 6 are used at meal time, the group of cards shown in FIG. 7 are used at bedtime, and the group of cards shown in FIG. 8 are used to encourage the child to get moving (coming and going).

DETAILED DESCRIPTION OF THE PREFERRED EMBODIMENTS

Card Games

Figure 3:
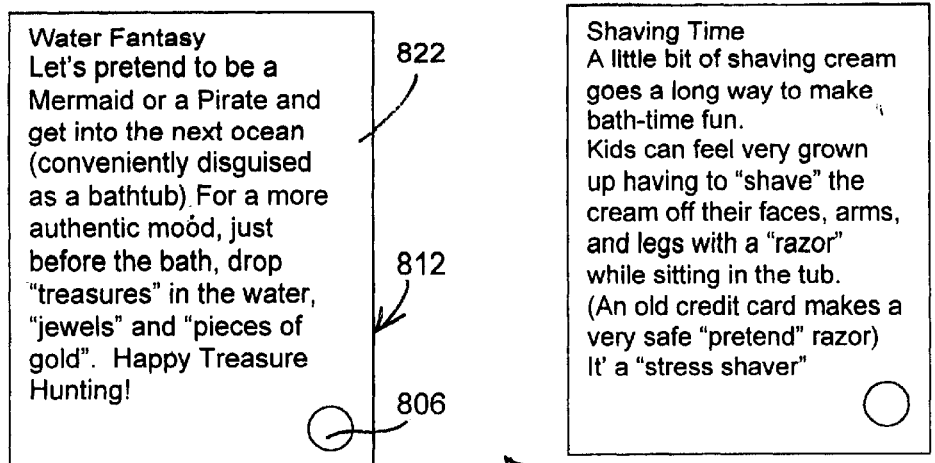
FIG. 3 shows the front of a group of cards.

As depicted in FIG. 1, a card board display 800 has mounted to it a key ring 802 carrying a number of playing cards 804, preferably laminated or otherwise made of a durable material. The key ring 802 carrying the cads 804 is easily portable for the parent. These cards 804 are divided into two separate groups 804A and 804B. The group 804A cards are all stacked next to each other and the group 804B cards are all stacked next to each other. Each card 804 has in a corner a hole 806 through which the key ring 802 passes. As shown in FIG. 1a, the cards in group 804A have on their backside 804a a colored strip 805. As shown in FIG. 1b, the cards in group 804B have on their backside 804a a colored strip 807 which is a different color than that of strip 805. As shown in FIG. 1a', the cards in group 804A each have a front side 808 on which is printed instructions for games where the child is active. Each individual card of the group 804A has front side with instructions for a different game than any other card in this group. As shown in FIG. 1b', the cards in group 804B each have a front side 810 on which is printed instructions for games where the child is encouraged to be substantially quit. In other words the instruction for the games of the group 804A cards tend to require very little, if any, physical activity, but require the child to engage his or her mind.

Figure 4:
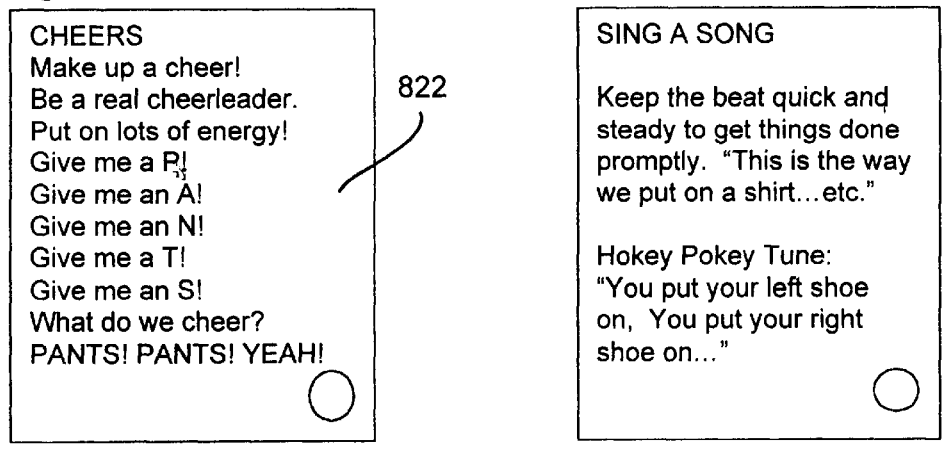
Figure 5:
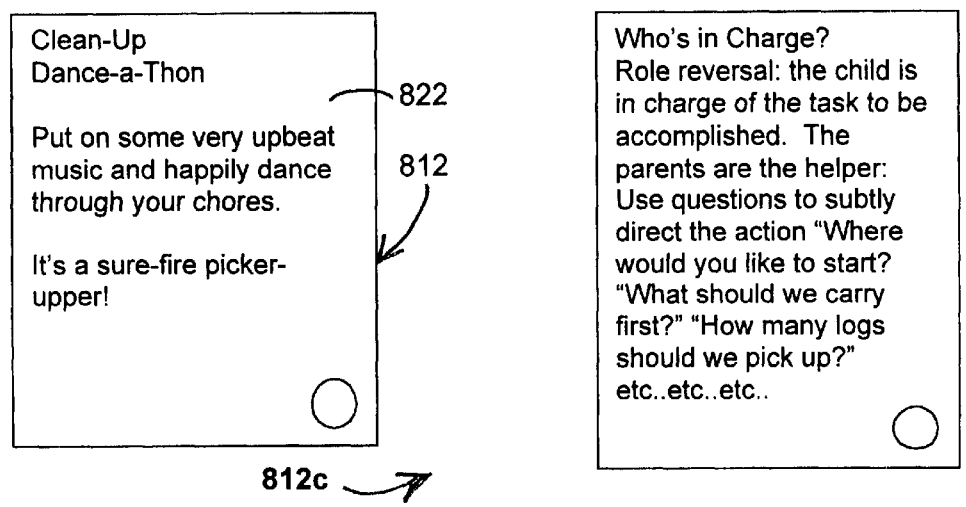
Figure 6:
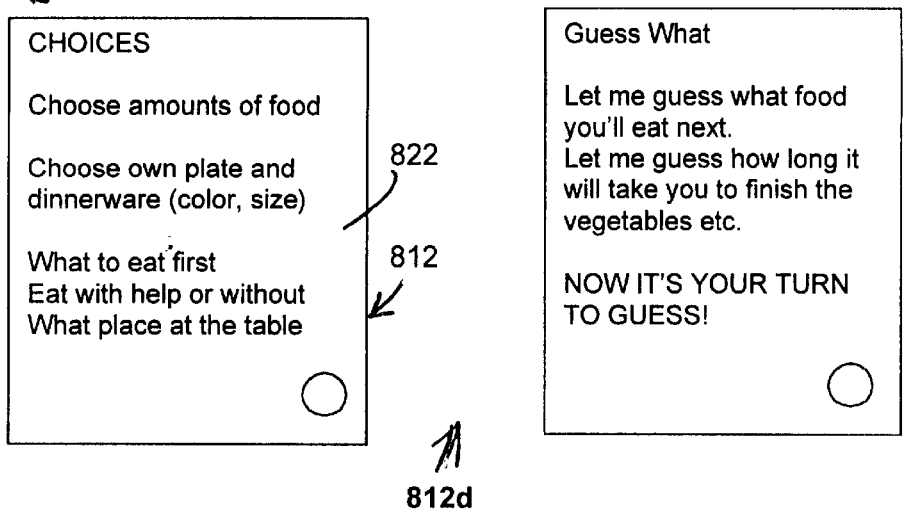
Figure 7:
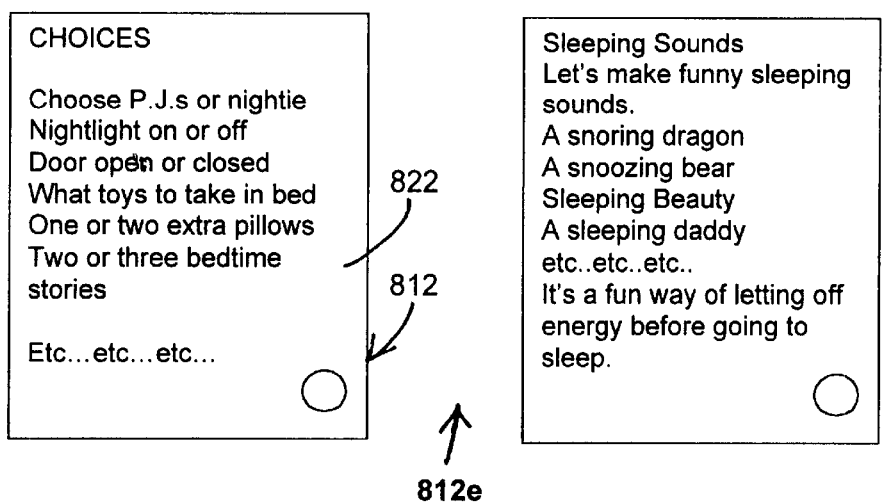
Figure 8:
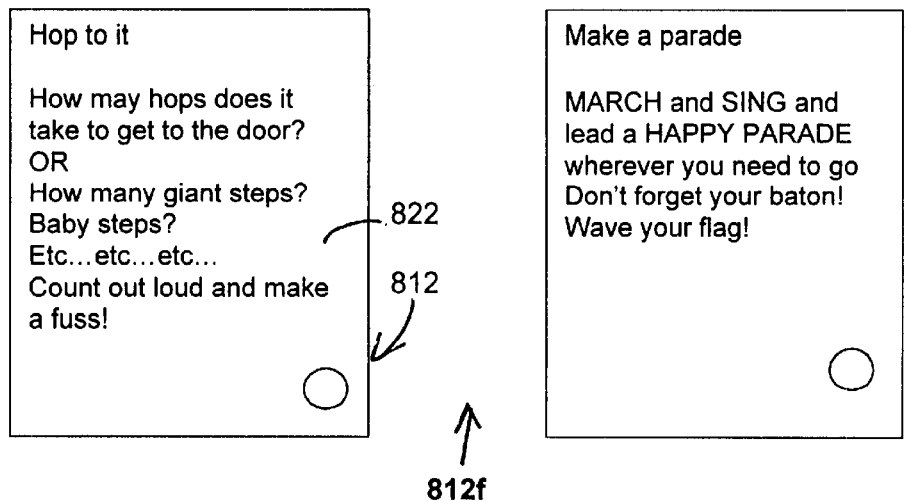

As illustrated in FIGS. 2 through 8, playing cards 812 similar to those discussed above are mounted on the key ring 802. As shown in FIG. 2, the backside 820 of the cards 812 is the same for all the cards. These cards are also in groups with the different groups being used in certain situations. The front side 822 of each card 812, however, has printed along an edge the situation where the different groups of cards is to be used. Specifically, the cards shown in FIG. 3 are in a group 812a and used at bath time. The cards shown in FIG. 4 are in a group 812b and used when getting dressed. The cards shown in FIG. 5 are in a group 812c and used to encourage the child to help out with chores. The cards shown in FIG. 6 are in a group 812d and used at meal time. The cards shown in FIG. 7 are in a group 812e and used at bedtime. The cards shown in FIG. 8 are in a group 812f and to encourage the child to get things done or get ready to go out, etc.

Using these cards 804 and 812 to play games provides a method whereby parents can motivate their kids to do what is good for them by harnessing the power of fun. Specifically, the cards include instructions that serve as prompts for parents about games they can have their child play on the spot to melt resistance over tasks to be done or cooperative actions to be performed. As shown on the cards 804 and 812, there are instructions for different games on each card. Preferably, these games require the parent or other caretaker to interact and engage in play with the child. The cards are color coded, or otherwise designated, for different situations in which the parent is seeking cooperation from their child. Depending on the situation, the parent selects the group of cards to be used. For example, at bedtime the group of cards shown in FIG. 7 are used. With the backside 804a or 820, as the case may be, facing the child so the child can not see the face side of the cards, the child picks a card and them the parent and child play the game outlined on the face side of the card.

In this way, the parent can fan the cards, with backside facing the child, and say "pick a card, any card." And the card will have an appropriate action for the child to perform that gets them off the dime so to speak. A specific example is the need for forward progression (e.g. stop dilly-dallying). The cards shown in FIG. 8 all indicate games to be played to encourage forward progression and may, for example, be color coded green. If the parent is at the mall and the child is dragging her heels, the parent whips out the cards and says, "Pick a green card, any green card." On each of several green cards, would be several related actions that the parent would choose from to give to the child as a mission. Options could include, by not be limited to:

Take three giant steps and one baby step.

Gallop

Skip

Step, step, wiggle, wiggle

Make up a silly walk

Yellow coded cards, for example, may be for situations where you want your child to be careful and the actions would be designed to slow your child down or keep your child close to you.

Hold on to my pinkie

Put you hand in my pocket

Give me your pinkie

Pretend you're my puppy on a leash

Take baby steps

Red coded cards, for example, may be for when a parent wants to stop a child from doing what they're doing and the actions represent healthy distractions. For example, the cards may be quiz cards such as:

What's your favorite movie (act out a scene, name the location, etc).

What's your favorite book (tell me all the characters you can think of).

What's your favorite fruit (Name five other kinds of fruit).

Who is your best friend (name ten other friends).

What's your favorite holiday (name three other holidays).

Questions about the alphabet

Questions about arithmetic

Questions about geography

Questions about animals
Questions about plants
Mission Cards may also be employed such as
Go over to the
Count the number of
Go touch each of the
Go find a on the sign
Find five things the color of Blue cards may, for example, involve getting ready for the day or getting ready for bed. Purple cards, for example, may include wacky zingers that "shock" your kids out of anger or tantrums. These can also be used for distractions in any situation. Pink cards, for example, may include actions designed to put a child in a more loving or empathetic frame of mind. Orange cards, for example, may involve ways to make cleaning up more fun.

The card game is a tool for the parents to get their kids to do what they want without yelling, threatening, or nagging. They will be sold as a standalone item or as part of a gift set that includes a book by the same name. Because they are organized by groups on the key ring or some other organizer such as Roldex® card organizer.

Scope of the Invention

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A method of enabling a caretaker of a child to play a game with the child that motivates the child to engage in a desired activity, said method comprising the steps of (a) assembling a plurality of cards into a deck, each card in the deck having one face with a common imprint and an opposite face imprinted with instructions for a play activity, (b) organizing said cards into different groups, each group corresponding to an activity especially suited to a certain situation, said different groups of cards being encoded to indicate the situation in which a selected card group is to be used, (c) selecting a group of cards and positioning the cards in the selected group with so the child cannot see the activity imprinted on the cards, and (d) with the cards in the selected group cards so positioned that the child cannot see the activity imprinted on the cards in the selected group, said child choosing a card from the selected group and then engaging in the activity imprinted on the chosen card.

2. The method of claim 1 where the cards are on a device that retains the cards in the assembled deck, said cards organized by groups.

3. The method of claim 2 where the device is a key ring.

4. The method of claim 1 where the encoding of the card groups is indicia of one or more words.

5. The method of claim 1 where the encoding of the card groups is indicia of color.

6. The method of claim 1 where the situation is selected from the group consisting of getting dressed, coming and going, mealtime, bedtime, helping out, and bath time.

7. The method of claim 1 where one group of cards is designed for an active situation and another group of cards is designed for a situation where the child needs to be substantially quit.

\* \* \* \* \*